US011313400B2

(12) United States Patent
Bredbeck et al.

(10) Patent No.: US 11,313,400 B2
(45) Date of Patent: Apr. 26, 2022

(54) PLUG-IN CONNECTION ARRANGEMENT AND METHOD FOR PREPARING A PLUG-IN CONNECTION ARRANGEMENT

(71) Applicant: WABCO GmbH, Hannover (DE)

(72) Inventors: Klaus Bredbeck, Landesbergen (DE); Dieter Frank, Hannover (DE); Morten Gehrke, Wennigsen (DE); Frank Vogelsang, Nienburg (DE); Thorsten Weber, Wunstorf (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 1241 days.

(21) Appl. No.: 15/559,835

(22) PCT Filed: Feb. 19, 2016

(86) PCT No.: PCT/EP2016/000295
§ 371 (c)(1),
(2) Date: Sep. 20, 2017

(87) PCT Pub. No.: WO2016/155861
PCT Pub. Date: Oct. 6, 2016

(65) Prior Publication Data
US 2018/0080490 A1 Mar. 22, 2018

(30) Foreign Application Priority Data

Mar. 30, 2015 (DE) .................... 10 2015 003 993.8
Jun. 10, 2015 (DE) .................... 10 2015 007 356.7

(51) Int. Cl.
*F16B 21/08* (2006.01)
*F16B 21/18* (2006.01)
(Continued)

(52) U.S. Cl.
CPC .............. *F16B 21/18* (2013.01); *F16B 21/08* (2013.01); *F16B 21/16* (2013.01); *F16L 21/035* (2013.01)

(58) Field of Classification Search
CPC ......... F16L 37/088; F16B 21/08; F16B 21/16; F16B 21/18
See application file for complete search history.

(56) References Cited

U.S. PATENT DOCUMENTS

| 3,149,845 A | 9/1964 | Knox |
| 3,445,120 A * | 5/1969 | Barr ........................ F16L 21/03 |
| | | 277/625 |

(Continued)

FOREIGN PATENT DOCUMENTS

| AT | 7195 U1 | 11/2004 |
| CN | 101260877 A | 9/2008 |

(Continued)

OTHER PUBLICATIONS

Translation of Office Action dated Feb. 21, 2020 of related Japanese Application No. 2017-542121.

*Primary Examiner* — Daniel J Wiley
(74) *Attorney, Agent, or Firm* — Leydig, Voit & Mayer, Ltd.

(57) ABSTRACT

A plug-in connection arrangement for a component includes a first portion having a first groove contour in a first annular groove arranged in the first portion, and a second portion having a second groove contour in a second annular groove arranged in the second portion. Via a resilient connection arrangement element arranged between the first portion and the second portion in the second annular groove, the first portion and the second portion can have a retention position relative to each other in a first position and which can be moved in an axial direction into a second position which is (Continued)

provided for operation. The second position is a sealing engagement position.

15 Claims, 5 Drawing Sheets

(51) Int. Cl.
*F16B 21/16* (2006.01)
*F16L 21/035* (2006.01)

(56) References Cited

U.S. PATENT DOCUMENTS

| | | | | |
|---|---|---|---|---|
| 4,225,263 A | * | 9/1980 | Asberg | F16B 21/18 |
| | | | | 403/326 |
| 4,407,482 A | * | 10/1983 | Daghe | F16K 27/00 |
| | | | | 251/148 |
| 5,080,521 A | * | 1/1992 | Quaile | F16B 21/18 |
| | | | | 285/321 |
| 5,411,348 A | | 5/1995 | Balsells | |
| 5,897,060 A | * | 4/1999 | Kon | B05B 3/1064 |
| | | | | 239/223 |
| 2006/0127200 A1 | | 6/2006 | Heiss | |

FOREIGN PATENT DOCUMENTS

| | | |
|---|---|---|
| DE | 69403174 T2 | 1/1998 |
| FR | 1473169 A | 3/1967 |
| JP | S54153276 U | 10/1979 |
| JP | S55154850 U | 12/1980 |
| JP | 2012077793 A | 4/2012 |

* cited by examiner

PLUG-IN CONNECTION ARRANGEMENT AND METHOD FOR PREPARING A PLUG-IN CONNECTION ARRANGEMENT

CROSS REFERENCE TO RELATED APPLICATIONS

This application is a U.S. National Stage Application under 35 U.S.C. § 371 of International Application No. PCT/EP2016/000295 filed on Feb. 19, 2016, and claims benefit to German Patent Application Nos. DE 10 2015 003 993.8 filed on Mar. 30, 2015 and DE 10 2015 007 356.7 filed on Jun. 10, 2015. The International Application was published in German on Oct. 6, 2016 as WO 2016/155861 A1 under PCT Article 21(2).

FIELD

The invention relates to a plug-in connection arrangement for a component. The invention further relates to a housing, in particular a motor housing, and a method for preparing, in particular at the factory side, a plug-in connection arrangement.

BACKGROUND

It is sometimes necessary initially to have to close a plug-in connection arrangement at the factory side because, on the one hand, components which are required for subsequent use are not connected until during subsequent assembly and, on the other hand, nevertheless a portion of the connection arrangement is intended to be protected. Such a factory-side closure of plug-in connection arrangements can be carried out by an additional transport securing element, which may lead, however, to increased production costs.

A known method for securing two components of a connection arrangement involves using a wire snap ring. During this method, a slotted ring of spring steel is introduced into a groove in the component which is intended to be inserted. The wire snap ring generally has to have a slightly greater annular diameter than the groove in the component to be inserted; it cannot carry out a sealing function in particular as a result of this. When the two components are joined via an inclined introduction member, the ring is deflected and strikes in the end position a counter-groove in a hole, where it decompresses again and therefore produces the fixing. However, this solution which is suitable per se leaves room for improvement, in particular because the wire snap ring has to be removed or exchanged again for specific applications if a component which is constructed with the connection arrangement is intended to be operated.

SUMMARY

In an embodiment, the present invention provides a plug-in connection arrangement for a component. The plug-in connection arrangement includes a first portion having a first groove contour in a first annular groove arranged in the first portion, and a second portion having a second groove contour in a second annular groove arranged in the second portion. Via a resilient connection arrangement element arranged between the first portion and the second portion in the second annular groove, the first portion and the second portion can have a retention position relative to each other in a first position and which can be moved in an axial direction into a second position which is provided for operation. The second position is a sealing engagement position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
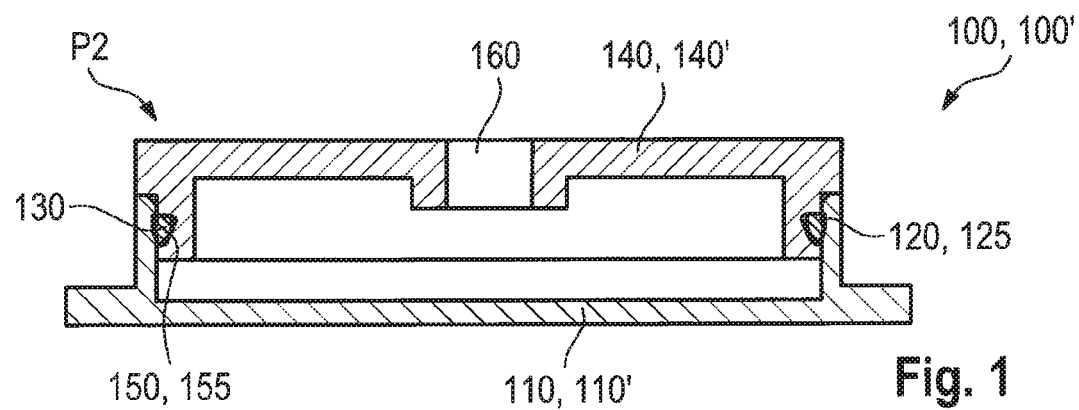
FIG. 1 is a cross-section of a plug-in connection arrangement in a second position (P2) according to a first embodiment of the invention.

Embodiments of the present invention provide an improved plug-in connection arrangement and an improved method for preparing, in particular at the factory side, the plug-in connection arrangement, in particular to improve known solutions for plug-in connection arrangements. An improved plug-in connection arrangement and an improved method for preparing, in particular at the factory side, the plug-in connection arrangement are described herein which are suitable for operating a component which is intended to be sealed, in particular which requires a sealed connection arrangement during operation.

According to an embodiment, a plug-in connection arrangement is provided for a component having a first portion and a second portion, having a first groove contour in a first annular groove which is arranged in the first portion, and having a second groove contour in a second annular groove which is arranged in the second portion, which, via a resilient connection arrangement element which is arranged between the first portion and the second portion in the second annular groove, can have a retention position relative to each other in a first position and which can be moved in an axial direction into a second position which is provided in particular for operation, wherein the second position is a sealing engagement position.

In the retention position, the first and second portions are fixed in position relative to each other in particular independently. Preferably, the first and second portions, in any case to some extent, are already engaged with each other at the resilient connection arrangement element. A sealing function can also already be provided in any case to some extent.

The sealing engagement position is sealing in the sense that an introduction of air and/or water or other fluids between the first portion and the second portion is reliably prevented as a result of the resilient connection arrangement element.

According to an embodiment, a component is provided having a housing; in particular a housing having a plug-in connection arrangement, in which the first portion is constructed as a motor cover and/or a shaft, in particular a motor cover which acts as a shaft, and the second portion is constructed as a motor housing, in particular a hole in the motor housing.

According to an embodiment, a motor housing is provided for connection to a crankcase of a compressor. The motor housing preferably has a plug-in connection arrangement according to the general aspect of the invention, wherein the first portion is a motor cover and the second portion is a hole in the motor housing.

In particular in the development of the general aspect of the invention, the motor cover is preferably used at the factory side as a transport securing means in the hole because the motor housing can advantageously be supplied without any crankcase screwed on. Consequently, the motor cover remains in this particular development in the retention position during an assembly operation and is manually moved into the sealing engagement position after the connection of the crankcase of the compressor to the motor housing.

A method according to an embodiment of the invention for preparing, in particular at the factory side, the plug-in connection arrangement, includes the following steps: positive-locking positioning of a receiving member of the first portion on the carrier of the second portion in the first position of a retention position, which receiving member is constructed so as to have the first annular groove, or positive-locking positioning of a carrier of the second portion in the receiving member of the first portion in the first position of a retention position, which carrier is constructed so as to have the second annular groove, axial movement of the first portion and the second portion relative to each other in an axial direction in order to move the component into the second position of a sealing engagement position, and optionally before the component is in the first position: arranging a sealing and retention element, in particular in the form of an O-ring, in only the second annular groove of a total groove in a third position of a preliminary retention position.

Preferably, the first portion is a portion of a cover which closes the second portion in an air-tight manner in the sealing engagement position which is present as a result of the second position. In particular, the component may be used to transport a gas in the sealing engagement position which is present as a result of the second position.

Consequently, in particular a discharge of air and/or water or other fluids through the intermediate space between the first portion and the second portion into the environment is prevented in the engagement position as a result of the resilient connection arrangement element; an introduction of air and/or water or other fluids through the intermediate space between the first portion and the second portion into an inner space is also prevented in the first portion and/or the second portion as a result of the resilient connection arrangement element.

The first portion is preferably constructed as a receiving member for the carrier; in this regard, the second portion is preferably constructed as a carrier which can be fitted into the receiving member or onto which the receiving member can be fitted. Preferably, the first portion has to this end an outer, in particular annular, frame or similar outer edge of the receiving member, in which an inner, in particular annular, retention member which is located on the second portion or similar inner edge of the carrier can be inserted.

The reverse situation is also possible, in which the second portion is preferably constructed as a receiving member for the carrier; in this regard, the first portion is then preferably constructed as a carrier which can be fitted into the receiving member or onto which the receiving member can be fitted. Preferably, the second portion then has to this end an outer, in particular annular, frame or similar outer edge of the receiving member, in which an inner, in particular annular, retention member which is located on the first portion or similar inner edge of the carrier can be inserted.

Preferably, the connection arrangement element is in the form of a sealing and retention element and therefore can seal the component while retaining the first and second portions relative to each other; in particular, seal between the first and second portions.

Preferably, the first portion and the second portion are each constructed in a cylindrical manner and/or have a cylindrical edge. It is thereby possible in a particularly simple manner to ensure an ability for positive-locking connection between the two portions in the sealing engagement position. In particular in the event that the resilient connection arrangement element is in the form of an O-ring, the first portion and the second portion are preferably constructed in a cylindrical manner. It is further advantageous for the use of such an O-ring which is industrially produced in a standard manner to ensure low production costs of the plug-in connection arrangement according to the invention because no complex production of such assembly components is necessary. Furthermore, the fitting of an O-ring is a process step with little complexity.

In a preferred development of the general aspect of the plug-in connection arrangement, the resilient connection arrangement element is constructed in the form of a sealing and retention element as an O-ring. The use of a component, such as an O-ring, which is industrially produced in a standard manner, ensures low production costs of the plug-in connection arrangement because no complex production of such assembly components is necessary; thus, the fitting of an O-ring which is produced, for example, from rubber, is a process step with little complexity. The use of an O-ring as a sealing and retention element is found to be particularly advantageous over exclusively using it as a sealing element and affords the possibility of retaining the first and second portions relative to each other for transport in conceptual terms.

In an embodiment, a volume of the resilient connection arrangement element which is deformed in the first position projects more substantially beyond a groove volume of a recess which is formed by the second annular groove and which is delimited by the second groove contour than a volume of the resilient connection arrangement element which is deformed in the second position. In particular a cross-section of the resilient connection arrangement element in the second position is more elliptical than in the first position. An advantage of this embodiment is that in the case of an ability for positive-locking connection between the two portions of the plug-in connection arrangement a change from the first position to the second position is also possible, that is to say, from the retention position into the sealing engagement position so as to deform the resilient connection arrangement element; advantageously, from a rather shapeless form which is substantially different from an elliptical form—in particular by the effect of the mentioned burr on the engagement projection—in the first position to a form which is nearer the elliptical form—in particular by the effect of the first and second groove contours at both sides of the resilient connection arrangement element.

The connection arrangement element is preferably in the form of a sealing and retention element, therefore it can seal the component so as to retain the first and second portions relative to each other; in particular it can seal between the first and second portions. The first position, as the retention position, is preferably provided for transport of the component; for example, from the manufacturer to the consumer. In this retention position, the component may but does not have to be already sealed. In any case, the second position, as the sealing engagement position, is preferably provided for operation of the component; for example, for introducing compressed air into and/or acting on the first and second portions of the component therewith or for sealing with respect to the environment. Optionally, however, before the component is in the first position, the following may be provided for: arranging a sealing and retention element, in particular in the form of an O-ring, in only the second annular groove of a total groove in a third position of a preliminary retention position. In particular, an O-ring is snap-fitted to this end through an assembly gap which exists between the first and second portions in only the second annular groove of a total groove.

In an embodiment, the first portion and the second portion each have an inclined introduction member, via which the first portion and the second portion can be moved into the retention position so as to deform the resilient connection arrangement element. The assembly of the plug-in connection arrangement is thereby simplified. Furthermore, the manual movement of the retention position to the sealing engagement position by displacing the first portion relative to the second portion is facilitated.

By moving the component, optionally from the preliminary retention position into the retention position and then from the retention position into the engagement position, in an advantageous manner a connection arrangement of the first portion and the second portion can initially be ensured in the context of the retention position. It can then also allow, as a result of corresponding manual input, compression of this connection arrangement for operation of the component without other components or a complex assembly step being necessary to this end. As a result of the fact that other components are unnecessary, the proposed plug-in connection arrangement also already results in a comparatively small spatial requirement and a small delivery complexity in the retention position.

The movement of the first and second portions of the component from the retention position of the first position into the sealing engagement position of the second position can preferably be carried out manually or in an automated or partially automated manner. In the first position as a retention position which is provided in particular for transport, the plug-in connection arrangement can be constructed in an air-tight manner.

The movement from the retention position into the sealing engagement position, which may be in particular automated and/or manual, without any complex additional assembly steps, such as, for example, the additional fitting of a sealing element, also involves the advantage of a simple ability to be assembled. This can result in a time saving during assembly and a reduction of the risk of injury. As a result of the resilient connection arrangement element, a similar retention strength can be ensured for retaining the first portion in the second portion in the context of the retention position, to that currently achieved by the wire snap ring explained in the introduction.

The resilient connection arrangement element further ensures that the first and second portions can be disassembled in the retention position and also after movement into the sealing engagement position. This may bring about destruction of the resilient connection arrangement element; however, it can readily be replaced. Furthermore, the following may optionally be provided for, before the component is in the first position: arranging a sealing and retention element, in particular in the form of an O-ring, in only the second annular groove of a total groove in a third position of a preliminary retention position. It is then also possible at any time to remove the sealing and retention element from the second annular groove again without it being destroyed. Preferably, in the third position, in particular a third position provided before factory-side assembly, the first and second portions may have a preliminary retention position relative to each other, in which the first portion is subjected to a retention force as a result of a resilient deformation of the resilient connection arrangement element between the first inclined introduction member and the chamfered second groove base, in particular the deformation is free from an action of a hook-like burr.

The second annular groove allows reliable introduction of the connection arrangement element in the second portion of the plug-in connection arrangement; that is to say, in particular according to the third position. A combination of the second annular groove with the first annular groove on the first portion of the plug-in connection arrangement results in the first and second positions in a manner dependent on a position of the annular grooves with the respective groove contours relative to each other; the total groove may but does not have to be formed by the first and second annular grooves with constant passing of the sides of the groove contours.

The position of the first annular groove, resilient connection arrangement element and second annular groove relative to each other is consequently characteristic of the presence of the retention position and the sealing engagement position.

The retention position is particularly provided for transport in that already assembly, in particular assembly at the factory side, of the plug-in connection arrangement has taken place and a position of the first and second portions relative to each other is ensured by the plug-in connection arrangement for transport.

In the retention position of the first position, a pressing pressure of the resilient connection arrangement element and therefore a retention pressure and as a result a retention force and/or positional force is preferably produced, as a result of resilient deformation of the resilient connection arrangement element, preferably counter to the first portion, which ensures a retention strength which is present in the retention position. The term "retention strength which is present in the retention position" is intended to be understood in this instance to be axial fixing of the first portion in any case, that is to say, fixing of the first portion on an axis in an axial direction, wherein the retention force Fr acts in a radial direction R and the positional force Fa acts in an axial direction A.

An advantage of a method according to the invention is a reliable transport of a component which is produced by the retention position which is arranged preferably at the factory side, and which comprises the plug-in connection arrangement; for example, in the context of transport to a consumer or operating location of the component. Furthermore, the consumer can now himself move the plug-in connection arrangement manually into the sealing engagement position so that complex assembly steps are avoided.

In an embodiment, by manual displacement of the first portion relative to the second portion, that is to say, by the displacement of the first annular groove relative to the second annular groove in an axial direction, the plug-in connection arrangement can be moved from the retention position into the sealing engagement position. In this instance, the resilient connection arrangement element must have sufficient free space as a result of the first groove contour and the second groove contour to allow the manual displacement of the first portion relative to the second portion but nevertheless to be subjected to pressure of the resilient structure thereof. There is in particular provision for a groove contour of the first annular groove and/or a groove contour of the second annular groove to be constructed: to apply a retention force and/or engagement function in conjunction with the resilient connection arrangement element in the form of a sealing and retention element and/or to allow assembly, in particular without damage.

In another embodiment, the first portion has a projection, wherein the first annular groove is constructed in such a manner that it is separated from the projection by a hook-like burr, and wherein furthermore the second groove contour has a chamfered second groove base.

In the context of a particularly preferred embodiment, the first portion has on a first edge a projection having an inclined introduction member and/or a hook-like burr, wherein the first annular groove is constructed in such a manner that it is separated from the projection by the hook-like burr.

In the context of another particularly preferred embodiment, the first portion on the first annular groove has the first groove contour having a chamfered first groove base and/or the second portion on the second annular groove has the second groove contour having a chamfered second groove base.

The plug-in connection arrangement is preferably subjected, in the first position of the first portion as a result of a resilient deformation of the resilient connection arrangement element between the hook-like burr and the chamfered groove base, to a retention pressure and therefore in particular a retention force in a radial direction.

Preferably, the resilient connection arrangement element has a cross-sectional region which is produced in the first position by the resilient deformation in a radial direction which is transverse relative to the axial direction and the smaller extent of which is limited by the inclined introduction member of the projection and the larger extent of which projects into the first annular groove behind the hook-like burr.

In this embodiment, the first portion can be separated from the second portion where applicable only by destroying the resilient connection arrangement element because the hook-like burr has to be guided past the greatest extent of the cross-sectional region of the resilient connection arrangement element, which region is produced by the resilient deformation. Accordingly, in this variant a separation of the first and second portions from each other is possible only with a comparatively great application of force.

In a preferred embodiment, the projection in the first portion is not in contact with an object in an axial direction in the present retention position. This allows movement of the plug-in connection arrangement into the second position which is provided in particular for operation of the component by displacing the first portion relative to the second portion in an axial direction.

There is preferably provision for the first portion to have the projection and a chamfered first groove base which extends in a sloping manner toward the projection and/or the second portion to have an abutment which limits an axial movement of the first portion relative to the second portion of the plug-in connection arrangement in an axial direction.

In an embodiment, consequently, the first portion has the projection and a first groove base which is chamfered toward the projection. Furthermore, the second portion has an abutment which delimits an axial movement of the first portion relative to the second portion of the plug-in connection arrangement in an axial direction and the second groove contour has the chamfered second groove base.

In an embodiment, there is provision for the first portion in the second position again to be subjected, as a result of a resilient deformation of the resilient connection arrangement element between the chamfered first and the chamfered second groove bases, to a retention pressure and in particular a retention force in a radial direction and/or a positional pressure and therefore in particular a positional force in an axial direction. To this end, there is in particular provision for an annular groove cross-section of a total groove which is formed from the first and second annular grooves to taper from the projection, wherein the groove bases taper toward each other from the projection and the projection and the abutment are in contact with each other.

Preferably, the projection further has such an axial length that in the second position the first portion is subjected, as a result of a resilient deformation of the resilient connection arrangement element between the chamfered first and the chamfered second groove bases and the hook-like burr, to a retention pressure and therefore a retention force in a radial direction and a positional pressure and therefore a positional force in an axial direction, wherein the positional force presses the projection and the abutment against each other.

In another advantageous embodiment, the first portion is fixed not only in an axial direction but also in all directions relative to the second portion by the hook-like burr which has already been explained in an earlier embodiment. Since the projection and the abutment are in contact with each other and consequently no additional introduction of the first portion into the second portion is possible, the hook-like burr ensures, by preventing the separation of the two portions, that the first portion is fixed relative to the second portion. In any case in an axial direction, a positive-locking connection is thus produced; in a rotational direction about the axial direction, the first portion is fixed against rotation relative to the second portion in a non-positive-locking manner.

In another embodiment, there is provision for the projection to have such an axial length that in the second position the first portion is subjected, as a result of a resilient deformation of the resilient connection arrangement element between the chamfered first and the chamfered second groove bases and the hook-like burr, to a retention pressure and therefore in particular a retention force in a radial direction and a positional pressure and therefore a positional force in an axial direction, wherein the positional force presses the projection and the abutment against each other. The in particular permanent positional pressure is advantageous for connection arrangements which are under a comparatively high pressure so that great forces act in a direction which would lead to a separation of the first and second portions from each other without the resilient connection arrangement element and consequently a separation of the plug-in connection arrangement. Furthermore, a pretensioning force which is produced in this manner can instead be increased by the mentioned comparatively high pressure. In specific terms, the resilient connection arrangement element can in a creeping manner avoid a force produced by the comparatively high pressure and as a result, in a state following the force produced by the comparatively high pressure, can be pressed into an annular groove which is opposite the force and can become engaged in this case. In an embodiment, the projection of the first portion is constructed so as to have an inclined introduction member and the second groove contour has the chamfered second groove base which has already been explained in a previous embodiment. It is preferable in a third position, in particular a third position provided before assembly at the factory side, for the first and second portions to have a preliminary retention position relative to each other, in which the first portion is subjected, as a result of a resilient deformation of the resilient connection arrangement element between the first inclined introduction member and the chamfered second groove base, to a retention pressure and therefore in particular a retention force in a radial direction, in particular the deformation is free from an action of the hook-like burr. Consequently, assembly at the factory side can already be prepared in a preassembled state of the component.

An additional embodiment, in which the first and the second annular grooves are constructed from a resilient material, also involves a simplification of the assembly of the plug-in connection arrangement. A greater contact face is thereby achieved between the resilient connection arrangement element and the first portion and between the resilient connection arrangement element and the second portion than are present in the case of rigid annular grooves. This may support in the case of the presence of the sealing engagement position a reliable provision of the sealing function of the resilient connection arrangement element and simplify the movement of the first position into the second position. In a different and preferred embodiment, the first and second annular grooves are formed from a rigid material. This ensures greater strength and robustness of the plug-in connection arrangement in the second position which is provided in particular for operation of the component.

In an embodiment, the first portion is a portion of a cover which closes the second portion in an air-tight manner as a portion of a corresponding receiving member in the sealing engagement position. In a variant of this embodiment, the cover is arranged at the factory side in the retention position relative to the receiving member in order to protect the receiving member during transport of the component comprising the receiving member. If, during assembly, no additional component is connected to the receiving member, the cover in this variant of the embodiment can be moved by additional manual and/or automated pressing of the cover and displacement of the cover thereby produced relative to the receiving member into the second position, that is to say, the sealing engagement position. The cover can be disassembled from the sealing engagement position at a later time by destroying the resilient connection arrangement element if at this later time an additional component is intended to be connected to the receiving member.

In another embodiment of the plug-in connection arrangement, the component is characterized in that it can be used in the sealing engagement position for pneumatic transport of air or another gas. In a variant of this embodiment, the plug-in connection arrangement is a portion of a pipe which is arranged at the factory side in the first position which is formed as a retention position. As a result of such a factory-side pre-assembly, the assembly can readily be carried out by the user by the pipe being pressed into the second portion which is in the form of a receiving member so that the plug-in connection arrangement is manually moved from the retention position into the sealing engagement position.

With regard to the method for preparing, in particular at the factory side, the plug-in connection arrangement, in an embodiment the arrangement of the O-ring in the annular groove of a receiving member is carried out only after a first positive-locking introduction of a carrier which is constructed so as to have an additional annular groove. In this instance, the O-ring is introduced from another side of the receiving member and only afterwards is the position provided for transport in respect of a retention position between the carrier and the receiving member taken up.

Methods described herein can be used with regard to particularly advantageous constructions, preferably in relation to an electric motor for fitting to a compressor in a compressed air supply, preferably for a compressed air supply unit for a vehicle. As explained in the context of the general aspect of the invention, however, the concept of the invention is not limited to embodiments with respect to an electric motor for fitting to a compressor in a compressed air supply.

FIG. 1 is a cross-section of a first embodiment of a plug-in connection arrangement 100 according to a general aspect of the invention in a second position P2 which is provided as a sealing engagement position. The plug-in connection arrangement 100 in this first embodiment has a first portion 110 having a first annular groove 120, in which an O-ring 130 is arranged in accordance with a first groove contour 125. A connection arrangement element in the form of a sealing and retention element is produced in this case in the form of the O-ring 130. Furthermore, the plug-in connection arrangement 100 has a second portion 140, wherein the O-ring 130 is also arranged in a second annular groove 150 of the second portion 140 in accordance with a second groove contour 155, whereby the component is sealed in an air-tight manner by engaging the first and second portions 110, 120. The plug-in connection arrangement 100, with the illustrated relative position of the first portion 110, the O-ring 130 and the second portion 140 relative to each other is therefore shown in a second position as a sealing engagement position.

This engagement position which is shown in FIG. 9F may be provided for operation of the component and the first and second portions 110, 120 can preferably be moved manually or in an automated or partially automated manner into this engagement position. Preferably, the component 100 is moved from a position provided for transport, that is to say, a retention position also shown in FIG. 9E, into the engagement position.

The first portion 110 and the second portion 140 are constructed cylindrically in this embodiment. The first and the second groove contours 125, 155 ensure, as a result of the construction and the contact face thereof which is thereby present with respect to the O-ring 130, a sealing function of the plug-in connection arrangement 100 in the present sealing engagement position. In this embodiment, the first portion 110 is formed as a cover which closes a line 160 which is connected to the second portion 140 in an air-tight manner.

In a developed embodiment of a preferred application, the first portion 110 is provided as a portion of a motor housing 110', for example, as a casing pipe, for connection to a crankcase of a compressor. According to a particularly preferred development, the first portion 110 is a motor cover and/or a shaft. Additionally or alternatively, according to a particularly preferred development the second portion 140 is an additional portion of a motor housing 140', in particular a dome-like housing portion, for example, a dome-like housing portion which is generally referred to as a CE bracket and which is known per se. Such a plug-in connection arrangement structurally corresponds to the first embodiment of the plug-in connection arrangement 100 of a component 100' according to the depiction from FIG. 1.

The electric motor is preferably used, via the motor housing thereof (generally a receiving member or second portion) and the cover (generally carrier or first portion), for fitting to a crankcase of a compressor in a compressed air supply. The compressed air supply is in this regard formed by the motor and the compressor and, in the context of a particularly preferred embodiment, is used for connection to a compressed air supply unit for a vehicle.

Figure 2:
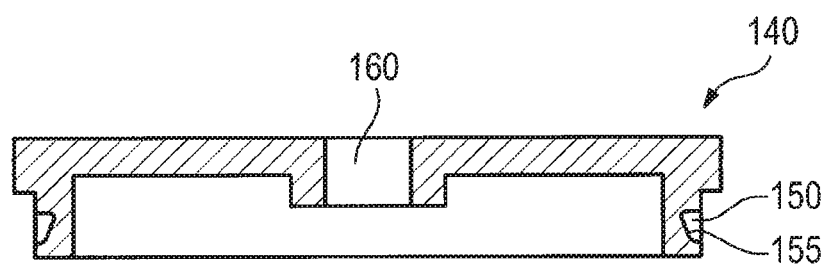
FIG. 2 is a cross-section of a second portion of the first embodiment of the plug-in connection arrangement according to FIG. 1.

FIG. 2 is a separate cross-section of the second portion 140 according to the first embodiment of the plug-in connection arrangement 100. The second portion 140 has, as already illustrated in FIG. 1, the second annular groove 150 and the line 160. The second annular groove 150 forms a second groove contour 155 which substantially ensures a retention strength of the second portion 140 on the first portion 110 in the presence of a retention position in conjunction with an O-ring which is arranged in the second annular groove 150.

Figure 3:
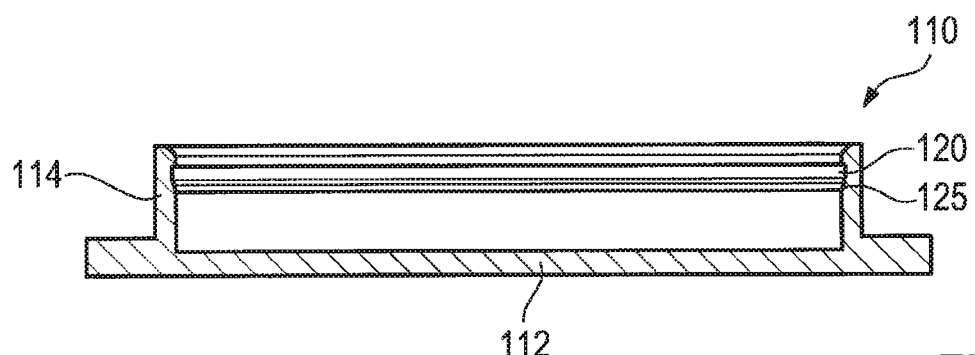
FIG. 3 is a cross-section of a first portion in the first embodiment of the plug-in connection arrangement according to FIG. 1.

FIG. 3 is a separate cross-section of the first portion 110 according to the first embodiment of the plug-in connection arrangement 100. The first portion 110 comprises a cover base 112 and a cover collar 114. The cover collar 114 has, as already illustrated in FIG. 1, the first annular groove 120. The first annular groove 120 forms in this instance a first groove contour 125 which substantially ensures a retention strength of the second portion 140 in the first portion 110 in the presence of a retention position.

Figure 4:
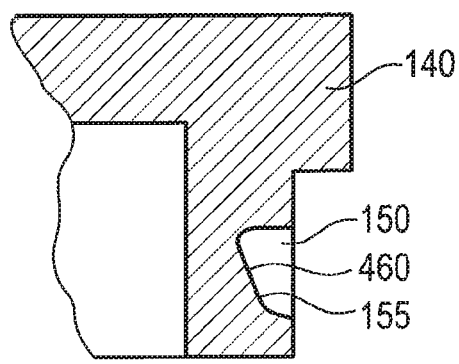
FIG. 4 is a detailed cross-section of a second annular groove in the first embodiment of the plug-in connection arrangement on the second portion according to FIG. 2.

FIG. 4 is a detailed cross-section of the second annular groove 150 of the second portion 140 in the first embodiment of the plug-in connection arrangement 100. The second annular groove 150 already illustrated in FIG. 1 and FIG. 2 and the second groove contour 155 are illustrated in detail in this Figure. In this instance, an asymmetry of the groove contour 155 can be seen inter alia, as a result of a chamfered groove base 460.

Figure 5:
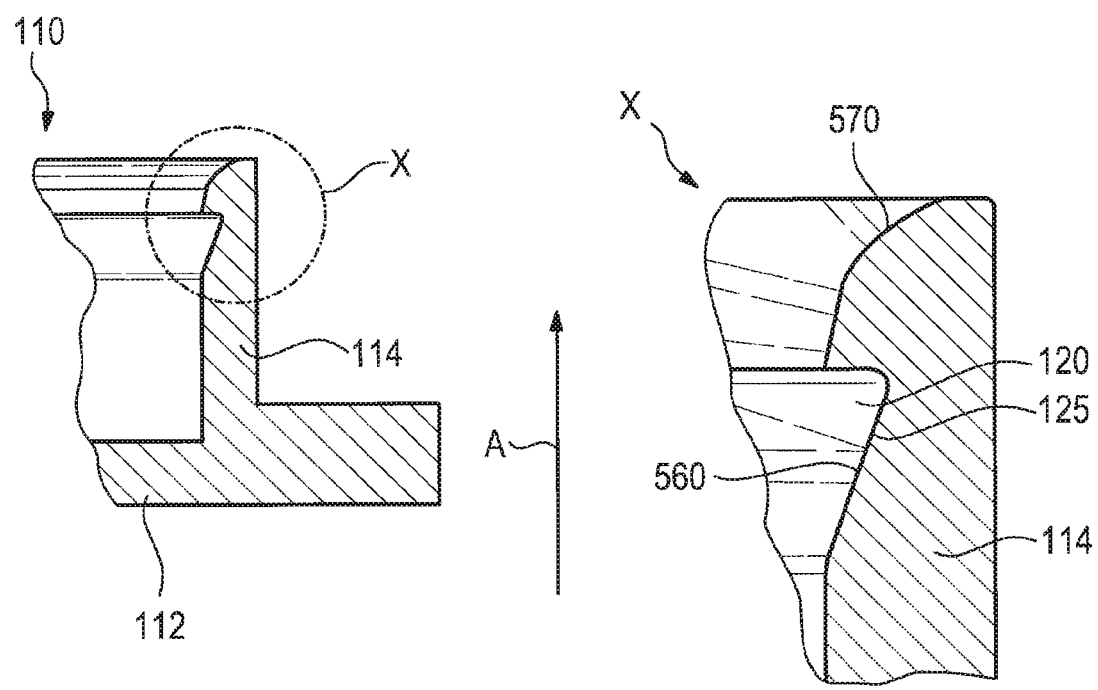
FIG. 5 is a detailed cross-section of a first annular groove in the first embodiment of the plug-in connection arrangement on the first portion according to FIG. 3 with a detail X of the first annular groove.

FIG. 5 is a detailed cross-section of the first annular groove 120 of the first portion 110 in the first embodiment of the plug-in connection arrangement 100. The cover base 112 and the cover collar 114 of the first portion 110 having the first annular groove 120 and the first groove contour 125 have already been illustrated in FIG. 1 and FIG. 3 and FIG. 5 is a detailed view of these features of the first portion 110, wherein the detail X is shown as an enlarged cross-section.

FIG. 5 shows that the first groove contour 125 is also asymmetrical because it also has a chamfered groove base 560. Furthermore, an inclined introduction member 570 can be seen on the cover collar 114. The assembly of the plug-in connection arrangement 100 is thereby simplified. Furthermore, the manual movement of the first position P1 (the retention position) into the second position illustrated in FIG. 1 (sealing engagement position) is made easier by the displacement of the first portion 110 relative to the second portion 140 in an axial direction A.

Figure 6:
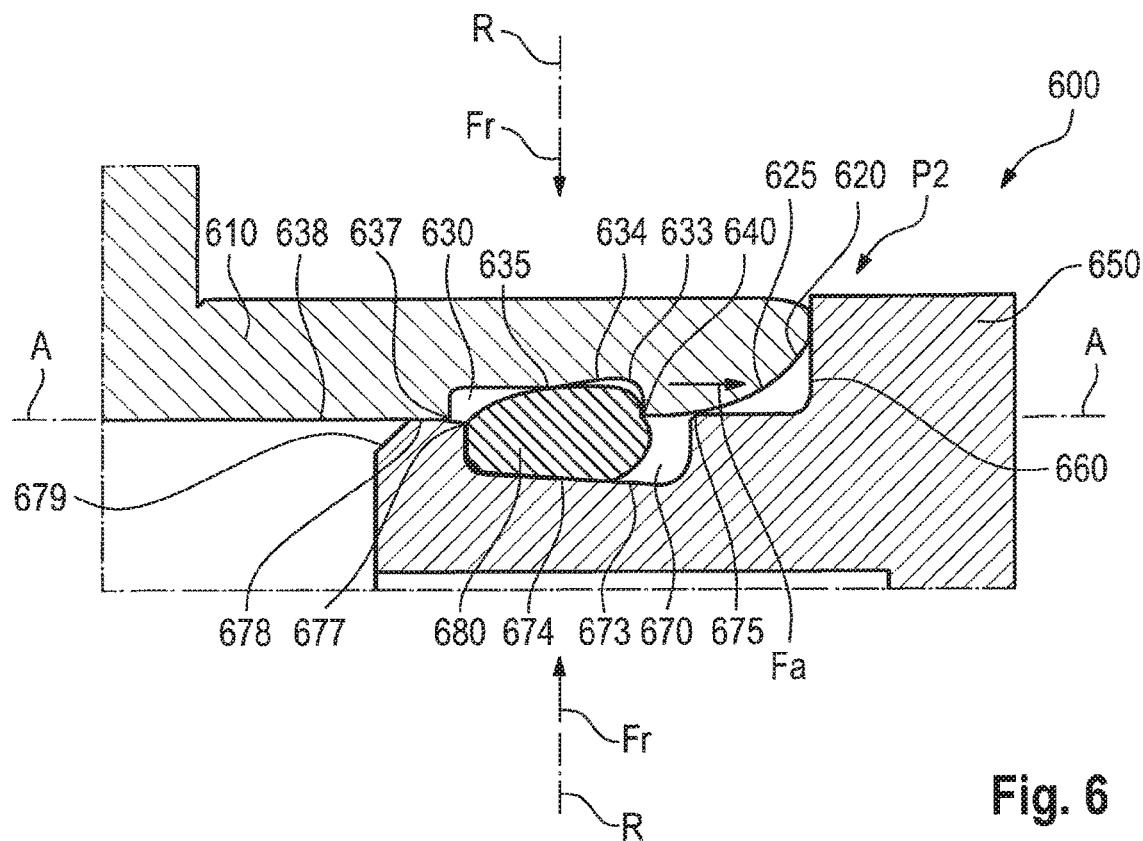
FIG. 6 is a cross-section of a first modification of the first embodiment of the plug-in connection arrangement in the second position (P2)

FIG. 6 is a cross-section of a first modification of the first embodiment of the plug-in connection arrangement 600 in the second position P2 as an engagement position which is preferably provided for operation. The first portion 610 has a projection 620 with an inclined introduction member 625, wherein a first annular groove 630 is constructed in such a manner that it is separated from the projection 620 by a hook-like burr 640. On the basis of the hook-like burr 640, the first groove contour 633 of the first annular groove 630 has a chamfered first groove base 634 which extends in a sloping manner toward the projection and which further has a protrusion 635. The first annular groove and an edge 638 of the first portion are separated from each other by means of a second burr 637.

Figure 7:
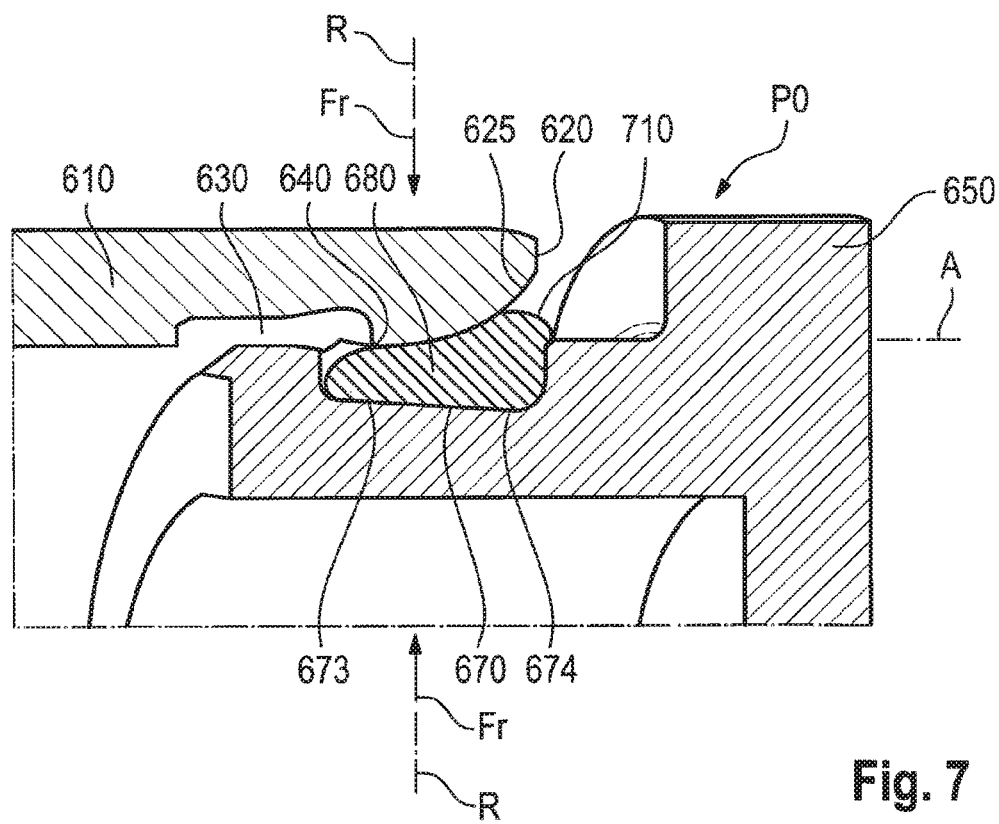
FIG. 7 is a cross-section of the first modification of the first embodiment of the plug-in connection arrangement in a third position (P0) provided before factory-side assembly.

The second portion 650 has an abutment 660 which limits an axial movement of the first portion relative to the second portion of the plug-in connection arrangement 600 in an axial direction A, that is to say, which limits the plug-in connection arrangement 600 in an axial direction A. Furthermore, the second portion 650 has a second annular groove 670 with a second groove contour 673 which has a chamfered second groove base 674. A groove volume of a recess which is formed by the first and second annular grooves 630, 670 and which is delimited by the first and second groove contours 633, 673 is in total smaller than a volume of the resilient connection arrangement element 680 which is deformed in the second position. In particular, a volume of the resilient connection arrangement element 680 which is deformed in the first position P1 projects substantially beyond a groove volume of a recess which is formed by the second annular groove 670 and which is delimited by the second groove contour 673 than a volume of the resilient connection arrangement element 680 which is deformed in the second position P2. In particular a cross-section of the resilient connection arrangement element 680 in the second position P2 is more elliptical than in the first position P1—this is shown by the comparison of FIG. 7/FIG. 8 or FIG. 9A, on the one hand, and FIG. 6 or FIG. 9F, on the other hand. In the second position shown in FIG. 6 and in FIG. 9F, the first portion 610 is subjected to a retention pressure and therefore a retention force Fr in a radial direction R as a result of a resilient deformation of the resilient connection arrangement element 680 between the chamfered first groove base and the chamfered second groove base 633, 673, wherein an annular groove cross-section of a total groove which is formed from the first and second annular grooves 630, 670 tapers from the projection 620, wherein the groove bases taper toward each other from the projection 620 and the projection and the abutment are in contact with each other.

The second groove contour 673 is separated from the support 660 by means of a first edge 675 and by a second edge 677 from an additional edge 678 of the second portion 650 which has an additional inclined introduction member 679.

An O-ring 680 is arranged between the first portion 610 and the second portion 650 in the annular grooves 630, 670 thereof. The projection 620 and the support 660 and the edge 638 and the additional edge 678 are in contact with each other.

The O-ring is resiliently deformed between the chamfered first groove base 634 and the chamfered second groove base 674 and the hook-like burr 640 so that in a cylindrical arrangement not illustrated in FIG. 6 of the plug-in connection arrangement 600 a retention pressure and a positional pressure exist between the first and second portions 610, 650 and accordingly a retention force Fr in a radial direction R and a positional force Fa in an axial direction A. A resilient deformation as a result of the hook-like burr 640 is produced by an axial length of the projection 620 with the inclined introduction member 625. The axial length of the projection 620 results in the hook-like burr 640 projecting beyond the first edge 675 into the second annular groove 670.

The positional pressure and the positional force Fa is advantageous for the plug-in connection arrangement 600 in the event that it is used under a high pressure so that great forces act in a direction which would, without the O-ring 680, result in a separation of the first and second portions 610, 650 from each other and consequently in a separation of the plug-in connection arrangement 600.

As a result of the retention pressure and the positional pressure, the two portions 610, 650 are fixed relative to each other and can be separated from each other only by destroying the O-ring 680. An identifiable engagement of the hook-like burr 640 behind the O-ring 680 makes it clear that a second position of the two portions 610, 650 relative to each other as provided in particular for operation of the component is present, which position is a sealing engagement position. The projection 620 has such an axial length that in the second position the first portion 610 is subjected to a retention force Fr in a radial direction R and a positional force Fa in an axial direction A as a result of a resilient deformation of the O-ring 680 between the chamfered first groove base and the chamfered second groove base 634, 674 and the hook-like burr 640, wherein the positional force presses the projection and the abutment against each other.

FIG. 7 is a cross-section, as is FIG. 6, of a first modification of the first embodiment of the plug-in connection arrangement 600 but unlike in FIG. 6 in a third position provided before factory-side assembly. Optionally, before the component is in the first position, this third position P0 is produced by arranging a sealing and retention element, in particular in the form of an O-ring 680, in only the second annular groove 670 of a total groove in the third position P0 of a provisional retention position.

The first portion 610 and the second portion 650 are constructed as already explained in the context of FIG. 6. The O-ring 680 is arranged only in the second annular groove 670. In the third position illustrated, it is resiliently deformed by the inclined introduction member 625 of the first portion 610 and the second groove contour 673 with the chamfered second groove base 674 and consequently ensures in the third position P0 a retention pressure which produces an axial fixing of the two portions 610, 650 relative to each other as a result of the retention force Fr which acts in a radial direction R. Such a third position P0 is intended to be considered to be a preliminary retention position of the two portions 610, 650 relative to each other provided before factory-side assembly. FIG. 7 further shows that the O-ring 680 has a cross-sectional region which is produced by the resilient deformation in a radial direction R which is transverse to the axial direction A and the greater extent of which is delimited by the inclined introduction member 625 of the projection 620 and the smaller extent 710 of which projects behind the hook-like burr 640 into the first annular groove 630.

In this case, however, unlike a second modification explained below, the hook-like burr 640 of the projection 620 at the end of the inclined introduction member 625 is provided to engage in the O-ring 680 only in the second annular groove 670. Thus, in particular a good retention function is also produced in addition to a sealing function which is already extremely good, wherein the first and second portions 610, 650 can be separated from each other only by destroying the O-ring 680.

Figure 8:
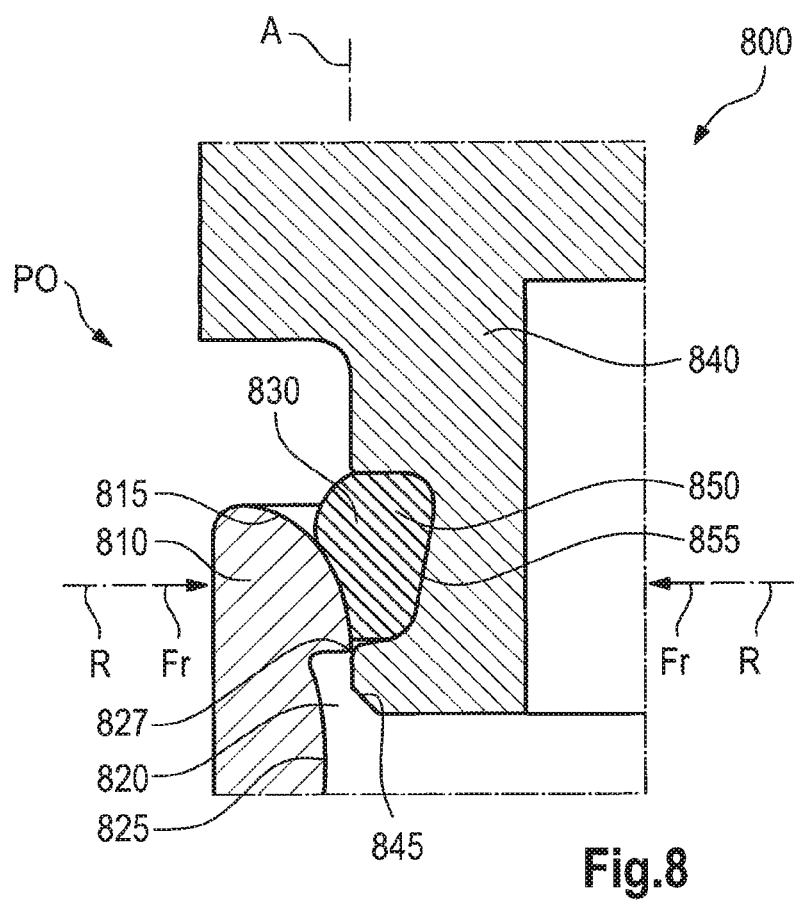
FIG. 8 is a cross-section of a second modification of the first embodiment of the plug-in connection arrangement in the third position (P0) provided before factory-side assembly.

FIG. 8 is a cross-section of a second modification of the first embodiment of the plug-in connection arrangement 800 in the third position P0 provided before factory-side assembly. Optionally, before the component is in the first position, this third position P0 is produced by arranging a sealing and retention element, in particular in the form of an O-ring 830, in only the second annular groove 850 of a total groove in the third position P0 of a provisional retention position.

A first portion 810 which has a first annular groove 820 and a first groove contour 825 is illustrated. A second portion 840 with the second annular groove 850 and the second groove contour 855 can further be seen. There is arranged in the second annular groove 850 a sealing and retention element as a resilient connection arrangement element in the form of an O-ring 830 between the first portion 810 and the second portion 840 of the plug-in connection arrangement 800. The illustrated position of the first portion 810, O-ring 830 and second portion 840 relative to each other form a third position of the plug-in connection arrangement 800 relative to each other, as already explained in the context of FIG. 7. A pressing pressure of the O-ring 830 produced by a resilient deformation of the O-ring 830 against an inclined introduction member 815 of the first portion 810 ensures in this case a retention pressure which produces an axial fixing of the two portions 810, 840 relative to each other as a result of the retention force Fr which acts in a radial direction R and therefore the retention strength which is present in the third position P0. The inclined introduction member 815 is separated from the first annular groove 820 by a hook-like burr 827. Both the first portion 810 and the second portion 840 are constructed cylindrically and have inclined introduction members 815, 845 which simplify assembly of the plug-in connection arrangement 800.

In this case, however, unlike the first modification, the hook-like burr 827 is provided to terminate substantially flush with a lateral wall of the second groove contour 855. Thus, there is produced a sealing function which is only moderate, in particular only a retention function of limited effectiveness, but the first and second portions 810, 840 can still be separated from each other without destroying the O-ring 830.

Figure 9:
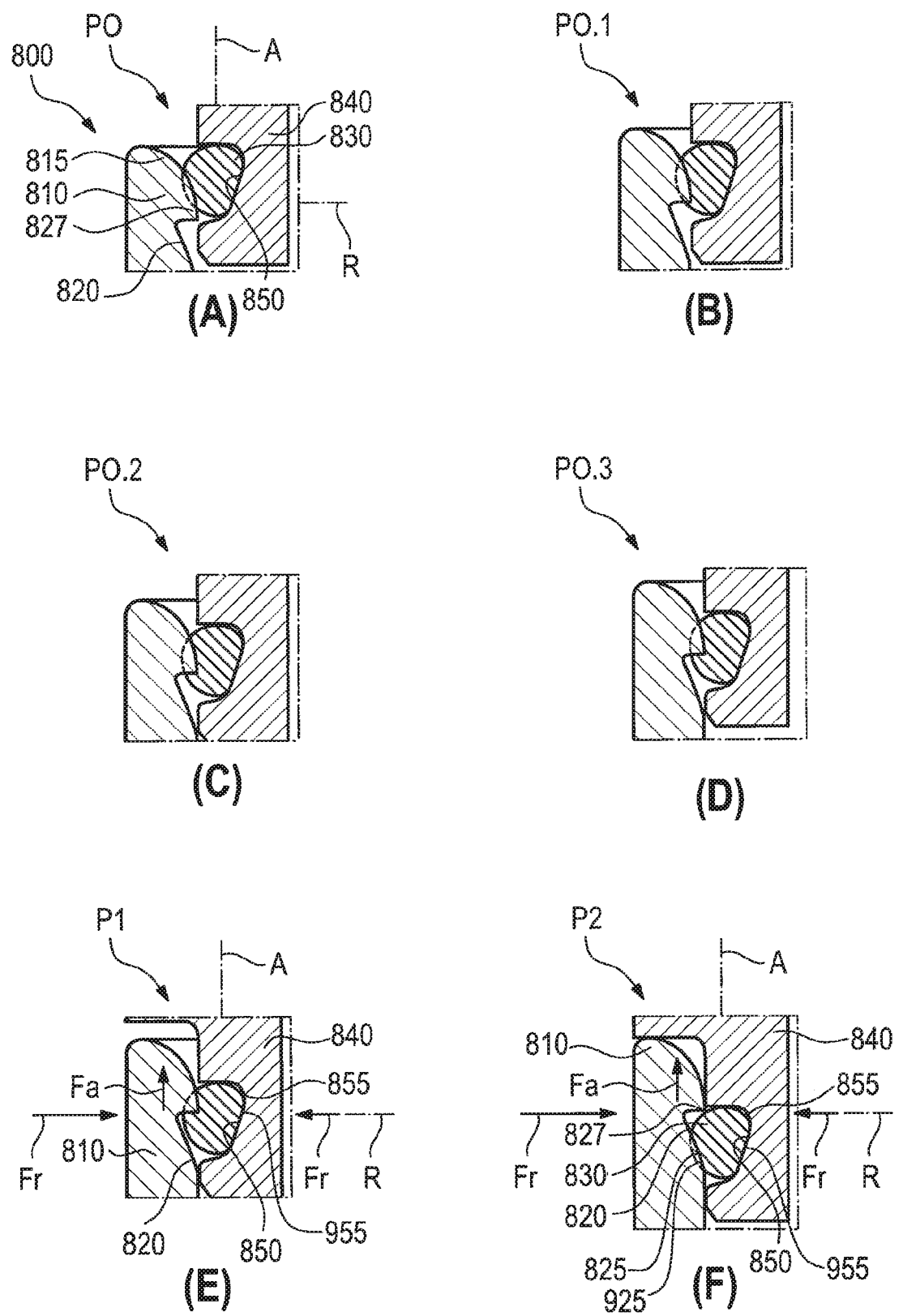
FIGS. 9A-9F are schematic illustrations of a position progression with respect to a sequence of positions P0, P1, P3 of the first and second portions relative to each other with a sealing and retention element in the form of an O-ring in a second annular groove of the second portion during the movement of the plug-in connection arrangement according to the second modification of the first embodiment from a third position (P0) provided before factory-side assembly, via intermediate positions (P0.1, P0.2 and P0.3) and a retention position of the first position (P1), into a sealing engagement position of the second position (P2).

With regard to the method according to the concept of the invention, FIG. 9 is a schematic illustration of a position progression with respect to a sequence of positions of the first and second portions relative to each other with a sealing and retention element in the form of an O-ring in a second annular groove of the second portion during the movement of the plug-in connection arrangement 800 according to the second modification (illustrated in FIG. 8) of the first embodiment from a third position (P0) provided before factory-side assembly, via intermediate positions (P0.1, P0.2 and P0.3) and a retention position of the first position (P1), into a sealing engagement position of the second position (P2); that is to say, relative positions of the first and second portions 810, 840 relative to each other between a position which is provided before factory-side assembly, a first position constructed as a retention position and a second position provided for operation of the component in respect of a sealing engagement position; the movement can be carried out manually, in a partially automated manner (therefore, manual and automated) or in an automated manner. The positions are described below.

FIG. 9A shows the third position which is provided before factory-side assembly, as already illustrated and explained in the context of FIG. 7 and FIG. 8. It can clearly be seen that the O-ring 830 has a cross-sectional region which is produced by the resilient deformation in a radial direction R which is transverse to the axial direction A and the smaller extent of which in position P0 does not yet project into the first annular groove 820 behind the hook-like burr 827 and the greater extent of which is delimited by the inclined introduction member 815 of the first portion 810.

The intermediate positions P0.1, P0.2 and P0.3 from FIG. 9B to FIG. 9D illustrate a displacement of the first portion relative to the second portion in the direction A, wherein the O-ring 830 becomes resiliently deformed in accordance with the displacement, preferably in a manual and/or automated manner. In this instance, it may be seen how the displacement also results in a displacement of the cross-sectional region of greatest extent in the radial direction R of the O-ring 830, which radial direction is transverse to the axial direction A. It can further be seen that the cross-sectional region of the O-ring 830 produced by resilient deformation has a smaller extent in the first annular groove 820 behind the hook-like burr 827 and a greater extent of the cross-sectional region is delimited by the inclined introduction member 815 of the first portion 810.

FIG. 9E shows a first position which is provided in particular for transport and which constitutes a retention position of the two portions 810, 840 relative to each other. As already explained in the context of FIG. 6, the first portion 810 has a projection, wherein the first annular groove 820 is constructed in such a manner that it is separated from the projection by a hook-like burr 827. Thus, the O-ring 830 is subjected to a retention force Fr which is formed by resilient deformation in a radial direction R between the hook-like burr 827 and a chamfered second groove base 955 of the second groove contour 855 which is formed in the second annular groove 850. In this instance, this resilient deformation of the O-ring 830 is constructed in such a manner that the O-ring 830 has a cross-sectional region which is produced by the resilient deformation in an axial direction A and the greatest extent of which is constructed in the first annular groove 820. The two portions 810, 840 are thereby also subjected to a positional force Fa in an axial direction A. Consequently, in the position shown in FIG. 9E, unlike the positions shown in FIG. 9A to 9D, a separation of the two portions 810, 840 can still be carried out only by destroying the O-ring 830. In preferred embodiments of the invention, this retention position referred to as the first position is already partially sealing in any case.

The displacement of the two portions 810, 840 ends with engagement of the O-ring 830 in the second annular groove 850, as illustrated in FIG. 9F in a position provided for operation of the component as a reliably sealing engagement position. The position illustrated therein is the reliably sealing engagement position in which the O-ring 830 is arranged both in the first annular groove 820 and in the second annular groove 850. As already explained in the context of FIG. 6, the first portion 810 is subjected both to a retention force Fr in a radial direction R and to a positional force Fa in an axial direction A as a result of the resilient deformation of the O-ring 830 as a result of the chamfered first and second groove bases 925, 955 and the hook-like burr 827.

FIG. 9 further illustrates the present functions of the first groove contour 825 and the second groove contour 855 according to this second modification of the first embodiment of the plug-in connection arrangement 800. The second groove contour 855 of the second portion 840 is constructed to retain the O-ring 830 and to form a resistance both for pressing of the first portion 810 out of the retention position of FIG. 9E and for pulling the first portion 810 out of the sealing engagement position of FIG. 9F. The first groove contour 825 is constructed to support both the engagement in the sealing engagement position and the resistance for pulling the first portion 810 from the sealing engagement position. The geometric shaping of the first groove contour 825 and the second groove contour 855 is carried out in accordance with this function; that is to say, in such a manner that an edge of the first portion 810 relative to an edge of the second portion 840 in principle has substantially a hooking shape.

In this case, the O-ring 830 has sufficient free space, as a result of the first groove contour 825 and the second groove contour 855, to allow the manual displacement of the first portion 810 relative to the second portion 840 but still to be subjected to pressing of the resilient structure thereof.

In all the embodiments illustrated in the drawings, the first and the second portions are each formed from a rigid material. In an embodiment which is not illustrated, the first and the second annular grooves are formed from a resilient material. A greater contact face between the O-ring and the first portion and between the O-ring and the second portion is thereby achieved than is present in the case of rigid annular grooves. This can support a reliable provision of the sealing function of the O-ring when the sealing engagement position is present.

While the invention has been illustrated and described in detail in the drawings and foreing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100, 100' Plug-in connection arrangement, component
110, 110' First portion, portion of a motor housing (casing pipe)
112 Cover base
114 Cover collar
120 First annular groove
125 First groove contour
130 O-ring
140, 140' Second portion, additional portion of a motor housing
150 Second annular groove
155 Second groove contour
160 Line
460 Chamfered groove base of second groove contour
560 Chamfered groove base of first groove contour
570 Inclined introduction member
600 Plug-in connection arrangement of first modification
610 First portion of first modification
620 Projection
625 Inclined introduction member of first portion of first modification
630 First annular groove of first modification
633 First groove contour of first modification
634 First groove base
635 Protrusion
637 Second burr
638 Edge
640 Hook-like burr
650 Second portion of first modification
660 Support
670 Second annular groove of first modification
673 Second groove contour of first modification
674 Second groove base
675 First edge
677 Second edge
678 Additional edge
679 Additional inclined introduction member of second portion
680 O-ring of first modification
710 Greater extent
800 Plug-in connection arrangement of second modification
810 First portion of second modification
815 Inclined introduction member of first portion of second modification
820 First annular groove of second modification
825 First groove contour of second modification
827 Hook-like burr of second modification
830 O-ring of second modification
840 Second portion of second modification
845 Inclined introduction member of second portion of second modification
850 Second annular groove of second modification
855 Second groove contour of second modification
925 First groove base of second modification
955 Second groove base of second modification A Axial direction
R Radial direction
P0 Third position
P0.1, P0.2, P0.3 Intermediate positions
P1 First position, retention position
P2 Second position, engagement position
Fr Retention force
Fa Positional force

The invention claimed is:

1. A plug-in connection arrangement for a component, the plug-in connection arrangement comprising:
a first portion having a first groove contour in a first annular groove arranged in the first portion;
a second portion having a second groove contour in a second annular groove arranged in the second portion;
the first portion having at a first edge a projection, the projection having an inclined introduction member and a hook-like burr;
the first annular groove being constructed in such a manner that the first annular groove is separated from the projection by the hook-like burr;
the first portion, on the first annular groove, having the first groove contour having a chamfered first groove base and the second portion, on the second annular groove, having the second groove contour having a chamfered second groove base; and
wherein, via a resilient connection arrangement element arranged between the first portion and the second portion in the second annular groove, the first portion and the second portion can have a retention position relative to each other in a first position by a resilient deformation of the resilient connection arrangement element, and which can be moved in an axial direction into a second position which is provided for operation, and
wherein in the first position the first portion is subjected to at least one retention force as a result of the resilient deformation of the resilient connection arrangement element between the inclined introduction member and the hook-like burr, and the chamfered second groove base of the second portion, and
wherein the second position is a sealing engagement position.

2. The plug-in connection arrangement as claimed in claim 1, wherein the resilient connection arrangement element is constructed in the form of a sealing and retention element and/or as an O-ring.

3. The plug-in connection arrangement as claimed in claim 1, wherein the first portion and the second portion are each constructed in a cylindrical manner and/or have a cylindrical edge.

4. The plug-in connection arrangement as claimed in claim 1, comprising:
a volume of the resilient connection arrangement element which is deformed in the first position;
a volume of the resilient connection arrangement element which is deformed in the second position;
a groove volume of a recess which is formed by the second annular groove and which is delimited by the second groove contour; and
wherein the volume of the resilient connection arrangement element which is deformed in the first position projects more substantially beyond the groove volume of the recess than the volume of the resilient connection arrangement element which is deformed in the second position, such that a cross-section of the resilient connection arrangement element in the second position is more elliptical than in the first position.

5. The plug-in connection arrangement as claimed in claim 1, wherein the resilient connection arrangement element has a cross-sectional region,
the cross-sectional region being produced in the first position by the resilient deformation in a radial direction that is transverse relative to the axial direction,
a smaller extent of the cross-sectional region being limited by the inclined introduction member of the projection, and
a larger extent of the cross-sectional region projecting into the first annular groove behind the hook-like burr.

6. The plug-in connection arrangement as claimed in claim 1, wherein in the first portion the chamfered first groove base extends in a sloping manner toward the projection and the second portion has an abutment which limits an axial movement of the first portion relative to the second portion of the plug-in connection arrangement in an axial direction.

7. The plug-in connection arrangement as claimed in claim 6, wherein the first portion in the second position is subjected to at least one retention force in a radial direction as a result of a resilient deformation of the resilient connection arrangement element between the chamfered first groove base and the chamfered second groove base, wherein an annular groove cross-section of a total groove which is formed from the first and second annular grooves tapers from the projection, wherein the groove bases taper toward each other from the projection, and wherein the projection and the abutment are in contact with each other.

8. The plug-in connection arrangement as claimed in claim 1, wherein the projection has an axial length such that in the second position the first portion is subjected, as a result of a resilient deformation of the resilient connection arrangement element between the chamfered first and the chamfered second groove bases and the hook-like burr, to at least one retention force in a radial direction and a positional force in an axial direction, wherein a retention pressure in particular presses the first and second portions against each other and/or a positional pressure presses the projection and the abutment against each other.

9. The plug-in connection arrangement as claimed in claim 1, wherein, in a third position is provided before factory-side assembly, the first and second portions have a preliminary retention position relative to each other in which the first portion is subjected in particular to a retention force as a result of a resilient deformation of the resilient connection arrangement element between the first inclined introduction member and the chamfered second groove base, in particular the deformation is free from an action of the hook-like burr.

10. The plug-in connection arrangement as claimed in claim 1, wherein the first portion is a portion of a cover which closes the second portion in an air-tight manner in the sealing engagement position which is present as a result of the second position.

11. The plug-in connection arrangement as claimed in claim 1, wherein the component may be used to transport a gas in a sealing engagement position which is present as a result of the second position.

12. A component having a motor housing and a crankcase of a compressor, the component having a plug-in connection arrangement as claimed in claim 1, wherein the first portion is constructed as a motor cover and/or a shaft, and wherein the second portion is constructed as a motor housing.

13. A method for preparing, at a factory side, a plug-in connection arrangement as claimed in claim 1, the method comprising:

positive-locking positioning of a receiving member of a first portion on the carrier of a second portion in a first position of a retention position, which receiving member is constructed so as to have a first annular groove, or positive-locking positioning of a carrier of the second portion in a receiving member of the first portion in the first position of a retention position, which carrier is constructed so as to have a second annular groove,
axially moving the first portion and the second portion relative to each other in an axial direction in order to move the plug-in connection arrangement into the second position of a sealing engagement position, and
arranging a sealing and retention element in the form of an O-ring, in only the second annular groove of a total groove in a third position of a preliminary retention position.

14. A plug-in connection arrangement for a component, the plug-in connection arrangement comprising:
a first portion having a first groove contour in a first annular groove arranged in the first portion;
the first portion having a projection and a chamfered first groove base which extends in a sloping manner toward the projection
a second portion having a second groove contour in a second annular groove arranged in the second portion; and
the second portion having an abutment which limits an axial movement of the first portion relative to the second portion of the plug-in connection arrangement in an axial direction,
wherein, via a resilient connection arrangement element arranged between the first portion and the second portion in the second annular groove, the first portion and the second portion can have a retention position relative to each other in a first position and which can be moved in an axial direction into a second position which is provided for operation,
wherein the second position is a sealing engagement position,
wherein the first portion in the second position is subjected to at least one retention force in a radial direction as a result of a resilient deformation of the resilient connection arrangement element between the chamfered first and the chamfered second groove bases, wherein an annular groove cross-section of a total groove which is formed from the first and second annular grooves tapers from the projection, wherein the groove bases taper toward each other from the projection, and
wherein the projection and the abutment are in contact with each other.

15. A component having a motor housing and a crankcase of a compressor, the component having a plug-in connection arrangement for a component, the plug-in connection arrangement comprising:
a motor cover having a first groove contour in a first annular groove arranged in the motor cover; and
a motor housing having a second groove contour in a second annular groove arranged in the motor housing;
wherein, via a resilient connection arrangement element arranged between the motor cover and the motor housing in the second annular groove, the motor cover and the motor housing can have a retention position relative to each other in a first position and which can be moved in an axial direction into a second position which is provided for operation, and wherein the second position is a sealing engagement position.

* * * * *